(12) United States Patent
Beaver

(10) Patent No.: US 11,468,462 B2
(45) Date of Patent: Oct. 11, 2022

(54) AUTOMATED CORPORATE PERCEPTION MANAGEMENT

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 16/829,485

(22) Filed: Mar. 25, 2020

(65) Prior Publication Data

US 2020/0327571 A1    Oct. 15, 2020

Related U.S. Application Data

(60) Provisional application No. 62/832,518, filed on Apr. 11, 2019.

(51) Int. Cl.
*G06Q 30/02* (2012.01)
*G06F 40/35* (2020.01)

(52) U.S. Cl.
CPC ......... *G06Q 30/0218* (2013.01); *G06F 40/35* (2020.01); *G06Q 30/0208* (2013.01)

(58) Field of Classification Search
None
See application file for complete search history.

(56) References Cited

U.S. PATENT DOCUMENTS

| | | | | |
|---|---|---|---|---|
| 2007/0198368 A1* | 8/2007 | Kannan | ............... | G06Q 30/02 705/26.62 |
| 2008/0249658 A1* | 10/2008 | Walker | ............... | G07F 9/02 700/232 |
| 2009/0077047 A1 | 3/2009 | Cooper et al. | | |
| 2010/0030648 A1* | 2/2010 | Manolescu | ............ | G06Q 30/02 705/14.66 |
| 2013/0336465 A1* | 12/2013 | Dheap | ............... | H04M 3/5166 379/88.01 |

(Continued)

FOREIGN PATENT DOCUMENTS

WO     WO-2016071917 A1 *  5/2016    ........... G06Q 30/016

OTHER PUBLICATIONS

F. Ankit Prakash, "How to Track and Monitor Social Media for Better Business opportunity?", retrieved from https://www.socialpilot.co/blog/how-to-monitor-social-media, available on Jul. 14, 2018 (Year: 2018).*

(Continued)

*Primary Examiner* — Sam Refai
(74) *Attorney, Agent, or Firm* — Meunier Carlin & Curfman LLC

(57) ABSTRACT

An external content engine automatically monitors content items generated by external data sources such as online merchants, social networking platforms, and discussion forums for an entity. The monitored content items may include public messages such as posts, reviews, and comments. When a content item is identified that references or relates to the entity, natural language processing is used to determine if the content item has a positive or negative context. The external content engine may then determine an action to take based on the context and other factors such as a popularity or influence of the author of the content item.

14 Claims, 5 Drawing Sheets

(56) References Cited

U.S. PATENT DOCUMENTS

| | | | |
|---|---|---|---|
| 2016/0196561 A1* | 7/2016 | Iyer | G06Q 50/01 |
| | | | 705/304 |
| 2016/0300023 A1 | 10/2016 | Leonard | |
| 2017/0046246 A1 | 2/2017 | Kaulgud et al. | |
| 2019/0034950 A1 | 1/2019 | Roux et al. | |
| 2020/0034893 A1* | 1/2020 | Anders | G06Q 30/0282 |

OTHER PUBLICATIONS

Bao, J., et al., "Question Generation With Doubly Adversarial Nets," IEEE/ACM Transactions on Audio, Speech, and Language Processing, vol. 26, No. 11, 2018, pp. 2230-2239.

International Search Report and Written Opinion, dated May 29, 2020, received in connection with corresponding International Patent Application No. PCT/US2020/024631.

\* cited by examiner

AUTOMATED CORPORATE PERCEPTION MANAGEMENT

CROSS-REFERENCE TO RELATED APPLICATIONS

This application claims the benefit of priority to U.S. Provisional Patent Application No. 62/832,518, filed on Apr. 11, 2019, entitled "Automated Corporate Perception Management," the contents of which are hereby incorporated by reference in its entirety.

BACKGROUND

Entities, such as companies, organizations, non-profits, government agencies, etc. typically are concerned about their public images and the public's opinion of them. These entities often spend large amounts of time and money trying to maintain a positive customer or stakeholder perception online. For example, an entity may pay employees or outside contractors a large amount of money to read online comments about the entity and respond accordingly, potentially across hundreds of websites and social media sites. Such approaches have the disadvantages that they are very time consuming, expensive, and may be error prone.

SUMMARY

An external content engine automatically monitors content items published on external data sources such as online merchants, social networking platforms, and discussion forums for an entity. The monitored content items may include public messages such as posts, reviews, and comments. When a content item is identified that references or relates to the entity, natural language processing is used to determine if the content item has a positive or negative context. The external content engine may then determine an action to take (e.g., post an apology, contact customer service, or offer a coupon or reward) based on the context and other factors such as a popularity or influence of the author of the content item.

In an implementation, a method for selecting actions to perform for an entity based on content items is provided. The method includes: monitoring a plurality of data sources for an entity by a computing device; detecting at least one content item associated with one data source of the plurality of data sources that is related to the entity by the computing device; determining whether the at least one content item has a negative context or a positive context by the computing device; selecting an action to perform based on the determined negative or positive context by the computing device; and performing the selected action by the computing device.

Implementations may include some or all of the following features. The plurality of data sources may include online merchants, social media platforms, or online forums. Detecting at least one content item associated with one data source of the plurality of data sources that is related to the entity may include detecting a content item that includes one or more of: a name of the entity, a website associated with the entity, a name of a product, a service, or a brand associated with the entity, an identifier of a social media account associated with the entity, an email address associated with the entity, a phone number associated with the entity, and a name of an executive or a spokesperson associated with the entity. The at least one content item may include one or more of a post or message on a social networking platform, a review, or a message on an online forum. Determining whether the at least one content item has a negative context or a positive context may include processing the content item using natural language processing. The action may include one or more of offering to a user associated with the at least one content item one or more of a reward, a discount, a gift, or an incentive. The method may include randomly selecting a size or amount of the one or more of the reward, the discount, the gift, or the incentive. The method may include: determining an influence associated with the user; and determining a size or amount of the one or more of the reward, the discount, the gift, or the incentive based on the determined influence. The influence may include determined based on a number of followers associated with the user. The method may further include: determining previous actions performed with respect to a user associated with the at least one content item; and selecting the action based on the previous actions performed.

In an implementation, a system for selecting actions to perform for an entity based on content items is provided. The system includes at least one processor and a non-transitory computer readable medium. The non-transitory computer readable medium includes instructions that, when executed by the at least one processor, cause the at least one processor to: monitor a plurality of data sources for an entity; detect at least one content item associated with one data source of the plurality of data sources that is related to the entity; determine whether the at least one content item has a negative context or a positive context; select an action to perform based on the determined negative or positive context; and perform the selected action.

Implementations may include some or all of the following features. The plurality of data sources may include social media platforms, online merchants, or online forums. Detecting at least one content item associated with one data source of the plurality of data sources that is related to the entity may include detecting a content item that includes one or more of: a name of the entity, a website associated with the entity, a name of a product, a service, or a brand associated with the entity, an identifier of a social media account associated with the entity, an email address associated with the entity, a phone number associated with the entity, and a name of an executive or a spokesperson associated with the entity. The at least one content item may include one or more of a post or message on a social networking platform, a review, or a message on an online forum. Determining whether the at least one content item has a negative context, or a positive context may include processing the at least one content item using natural language processing. The action may include offering to a user associated with the at least one content item one or more of a reward, a discount, a gift, or an incentive. The instructions may further cause the system to randomly select a size or amount of the one or more of the reward, the discount, the gift, or the incentive based on the determined influence. The instructions may further cause the system to: determine an influence associated with the user; and determine a size or amount of the one or more of the reward, the discount, the gift, or the incentive based on the determined influence. The influence may be determined based on a number of followers associated with the user.

In an implementation, a non-transitory computer readable medium is provided. The medium includes instructions that, when executed by at least one processor, cause the at least one processor to: monitor a plurality of data sources for an entity; detect at least one content item associated with one data source of the plurality of data sources that is related to the entity; determine whether the at least one content item has a negative context or a positive context; select an action to perform based on the determined negative or positive context; and perform the selected action.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
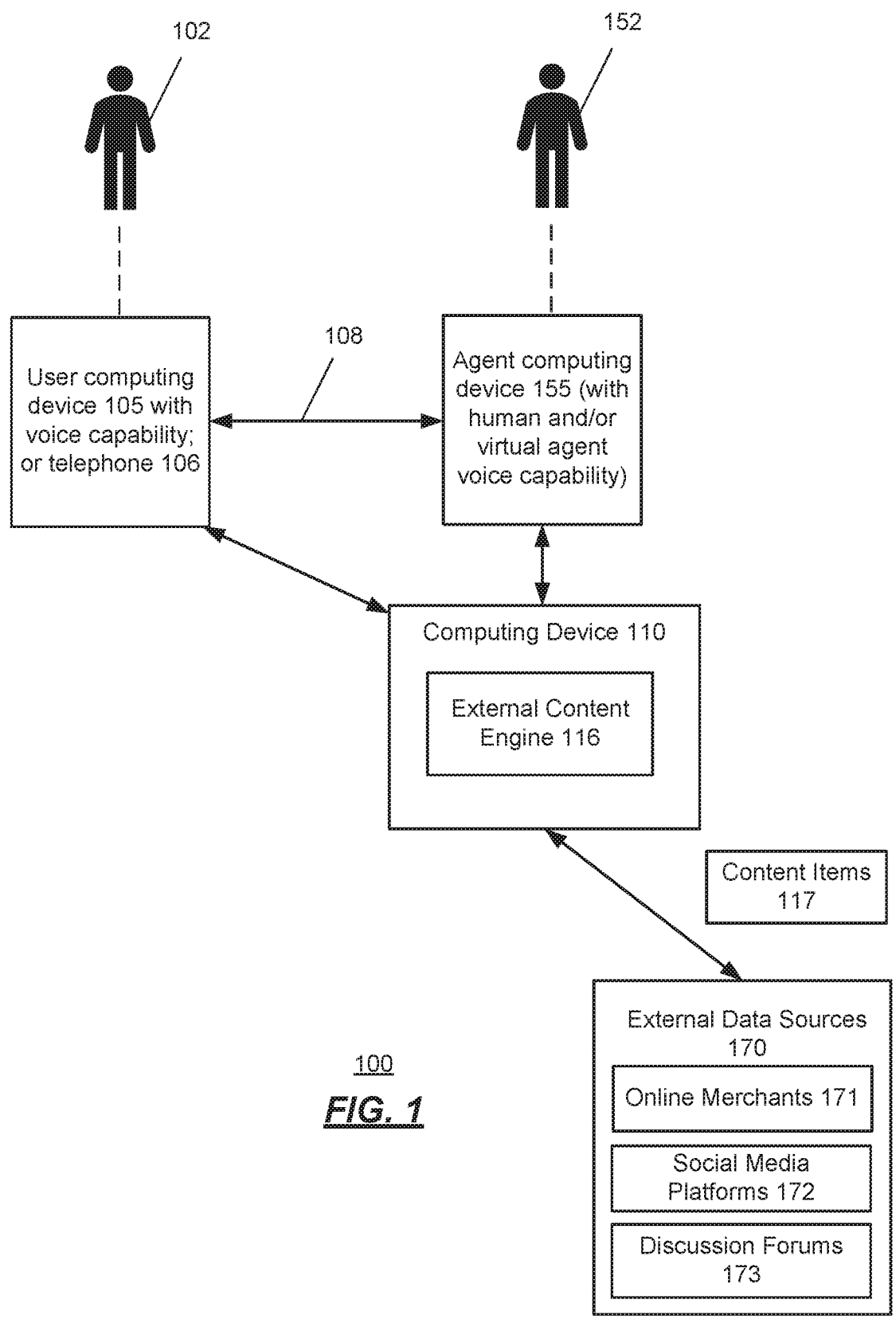
FIG. 1 is an illustration of an exemplary environment for monitoring external sources such as social media platforms and online discussion forums for positive or negative content items.

FIG. 1 is an illustration of an exemplary environment 100 for monitoring external sources such as social media platforms and online discussion forums for positive or negative content items. A user 102, using a user computing device 105 with voice capability or using a telephone 106, contacts an entity through a network 108. The entity may include a company or organization. More particularly, the user 102 contacts an agent 152 (or representative, employee, associate, etc.) of an entity using the user computing device 105 or the telephone 106 in communication with an agent computing device 155 via the network 108. The agent computing device 155 has human voice capability. Additionally, or alternatively, the agent computing device 155 has virtual agent voice capability.

A computing device 110 may be in communication with the agent computing device 155 and/or the user computing device 105 or the telephone 106 to monitor the speech in a voice call (i.e., the conversation) between the user computing device 105 (or the telephone 106) and the agent computing device 155. The computing device 110 may be implemented in, or embodied in, a desktop analytics product or in a speech analytics product, in some implementations.

The network 108 may be a variety of network types including the public switched telephone network (PSTN), a cellular telephone network, and a packet switched network (e.g., the Internet). Although only one user computing device 105/telephone 106, one agent computing device 155, and one computing device 110 are shown in FIG. 1, there is no limit to the number of computing devices 105, 155, 110 and telephones 106 that may be supported.

Figure 5:
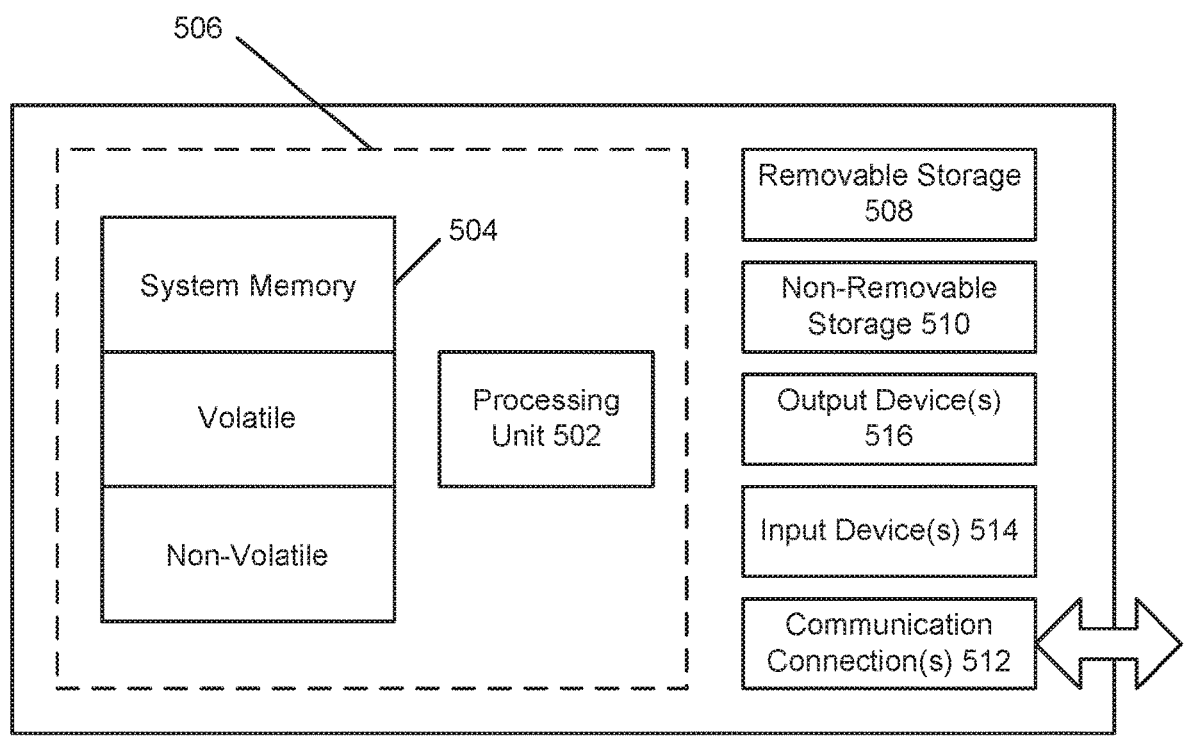
FIG. 5 shows an exemplary computing environment in which example embodiments and aspects may be implemented.

The user computing device 105, the agent computing device 155, and the computing device 110, may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 5 as the computing device 500.

As described above, many users 102 may generate content items 117 about an entity and may post or publish those content items 117 on one or more external data sources 170. Content items 117 as used herein may include posts, reviews, tweets, messages, or any other type of electronic communication published to one or more external data sources 170. External data sources 170 may include online stores or merchants 171 (e.g., Amazon.com, Walmart.com, Target.com), social media platforms 172 (e.g., Facebook, Twitter, and LinkedIn), and discussion forums 173 (e.g., Reddit, Quora, and stack overflow). Other external data sources 170 may be supported.

In order to protect their brands and provide effective customer service to users 102, each entity must be able to monitor content items 117 that are related to the entity on external data sources 170 and must be able to quickly respond or react to the related content items 117. However, given the sheer number of external data sources 170 and content items 117 that are generated and published every day, it is impossible for an entity to employ enough agents 152 to review and respond to content items 117 that are related to the entity in a way that is both cost effective and time sensitive.

Accordingly, to automate the process of identifying and responding to content items 117, the computing device 110 may include an external content engine 116. The external content engine 116 may continuously monitor a plurality of external data sources 170 for content items 117 that are related to the entity. Depending on the embodiment, a content item 117 may be related to the entity if it includes the name of the entity or a brand or product associated with the entity. Once a related content item 117 is identified, the external content engine 116 may use natural language processing to determine if the content item 117 has a negative or positive context, and may select an action to automatically perform based on the determined context as well as information about the user who created, posted, or published the content item 117. The action may include responding to the content item 117 and/or offering a reward, gift, coupon, or other incentive to the determined user. The external content engine 116 is described in more detail with respect to FIG. 2.

Figure 2:
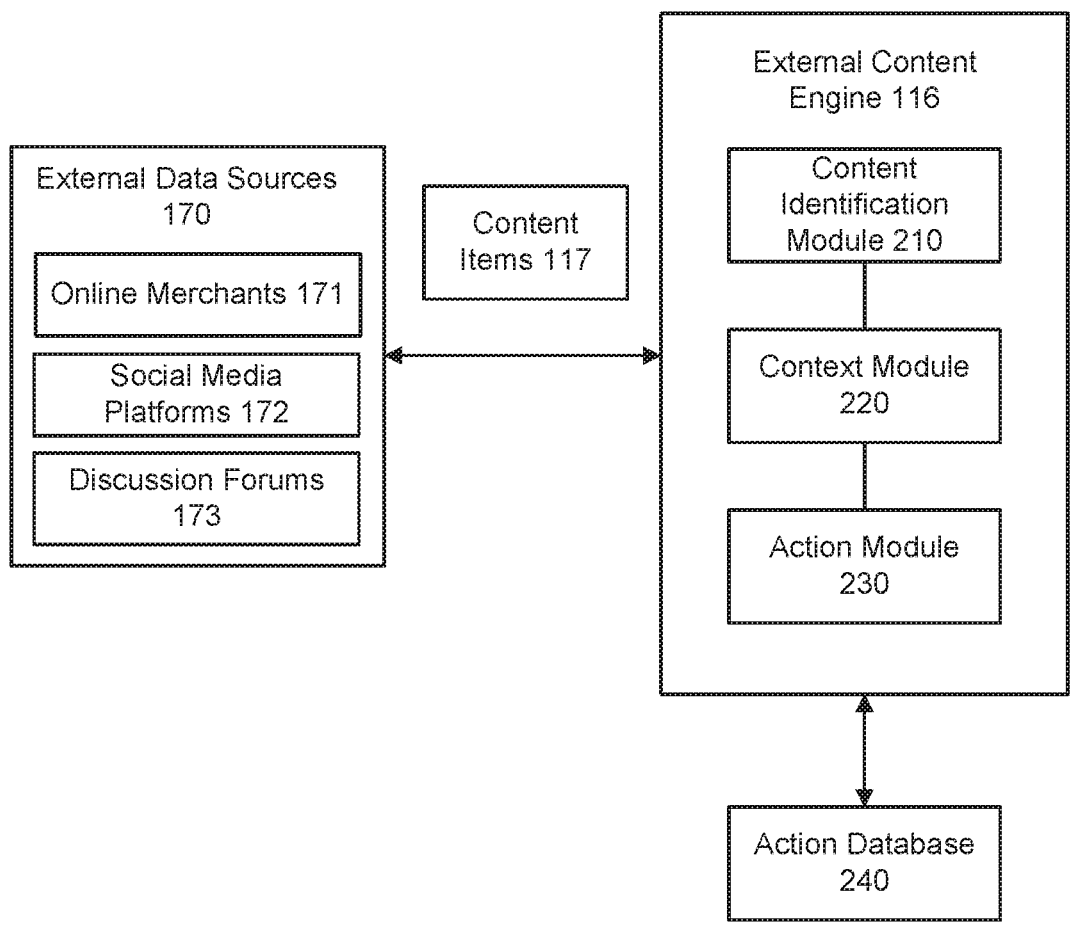
FIG. 2 is an illustration of an example external content engine.

FIG. 2 is an illustration of an example external content engine 116. In the example shown, the external content engine 116 includes several components or modules including, but not limited to, a content identification module 210, a content module 220, and an action module 230. The various modules of the external content engine 116 may be implemented together, or in part, by the computing device 500 illustrated with respect to FIG. 5.

The content identification module 210 may identify content items 117 available on one or more external data sources 170 such as online merchants 171, social media platforms 172, and discussion forums 173. Other external data sources 170 may be included. Content items 117 may include any type of electronic message or communication that may be published on, posted to, or otherwise made available by an external data source 170. Examples of content items 117 include product or restaurant reviews, posts on social media platforms 172 such as tweets, wall-posts, or stories, and posts and replies on online discussion forums 173. Other types of content items 117 may be supported. Note that content items 117 are not limited to text or word-based content and may include audio or video content.

Initially, an entity may provide the content identification module 210 a list of keywords or phrases that are associated with the entity. These may include the name or names of the entity, trademarks associated with the entity, and the names of one or more products or services associated with the entity. The keywords or phrases may further include the names or handles used by the entity on one or more social media platforms 172, any hashtags used by the entity or that are used by others to refer to the entity, as well as the names of any spokespersons associated with the entity or executives associated with the entity (e.g., the name of the CEO).

Depending on the embodiment, the content identification module 210 may initially search for relevant content items 117 that include one or more of the keywords and phrases provided by the entity from a list of popular external data sources 170. The entity may further specify additional external data sources 170 or may remove certain external data sources 170 from the list. For example, the entity may be a resort chain and may not be interested in monitoring online merchants 171 such as Amazon.com but may be interested in monitoring a particular discussion forum 173 popular with travel agents.

The content identification model 210 may provide the identified relevant content items 117 to the context module 220. In some embodiments, the content identification module 210 may calculate a relevance score for each identified content item 117 and may only provide content items 117 whose score exceeds a threshold. The score may be based on a variety of factors such as how many keywords or phrases are found in the content item 117, for example. Any method for calculating relevancy may be used.

The context module 220 may receive an identified content item 117 and may determine a context for the content item 117. The context for a content item 117 may include the text (or audio or video) associated with the content item 117 along with other information such as an associated score or review, and any replies or follow-up communications made to the content item 117 by the same user or other users.

The context module 220 may determine whether or not the determined context is a positive context or a negative context. Depending on the embodiment, the context module 220 may determine if the context is positive or negative using natural language processing. In particular, the content module 220 may determine if the associated content item 117 has a positive or negative sentiment. For example, a negative sentiment may be indicated by negative words such as "poor", "broken", "cheap", and "bad", while a positive sentiment may be indicated by positive words such as "good", "excellent", "high-quality", and "great". Any method for determining whether a context is negative or positive may be used.

The action module 230 may perform one or more actions for each determined content item 117 based on the determined context. In some embodiment, the action module 230 may perform the action with respect to the external data source 170 associated with the content item 117. For example, if the content item 117 is a post on a social media platform 172, the action module 230 may perform the action of posting a response to the content item 117 on the social media platform 172. If the content item 117 is a review on an online merchant 171, the action module 230 may perform the action of posting a response to the content item 117 on the online merchant 171.

The content of the response may depend on whether or not the content item 117 has a negative context or a positive context. If the content item 117 has a positive context, then the response may include language thanking the user. If the content item 117 has a negative context, then the response may include language apologizing to the user and encouraging the user to reach out to an agent 152.

In some embodiments, after performing an action, the action module 230 may store a record of the action in an action database 240. The record may include an identifier of the content item 117 and associated external data source 170, the determined context, a user or user account associated with the content item 117, and an indicator of the action that was performed. By maintaining records of the actions that were performed, the action module 230 may ensure that actions are not duplicated and may allow one or more agents 152 to follow up with a user about whether or not their issue was resolved or to thank them for their kind words.

With respect to content items 117 with negative contexts, the actions may include offering one or more "gifts" such as coupons or discount codes. For example, the action module 230 may offer a user who posted a negative review a 20% off coupon. Depending on the embodiment, the amount of the coupon or discount may be randomized to discourage users from posting negative content items 117 to receive discounts.

With respect to content items 117 with positive contexts, the actions may include offering one or more rewards such as offers of free promotional merchandise (e.g., t-shirts or stickers) or coupons or discounts on future purchases. For example, the action module 230 may offer a user that praised a new set of speakers a free t-shirt that includes the brand associated with the speakers. The action may further include offering coupons or discounts to friends or followers of the user that created by the content item 117.

Depending on the embodiment, for content items 117 with both positive and negative contexts, the size of the gift or reward (e.g., the % discount or credit) may depend on the influence of the user who posted the content item 117. The influence of a user may depend on the external data source 170 associated with the content item 117 and may be based on factors such as the number of friends or followers the user has, the number of likes or views that the particular content item 117 has, or the number of reviews that the user has created. Any methods for calculating influence may be used.

The action module 230 may increase or decrease the size of the gift or reward proportional to the size of the influence associated with the user. For a user with a small influence, the action module 230 may provide a small gift or reward because it is unlikely that many other users will see the reward or gift. However, for a user with a large influence, the action module 230 may provide a large gift or reward because it will likely be seen by many other users and may help improve the reputation of the entity or a brand associated with the entity.

The action module 230 may further consider any records of past actions associated with the user in the action database 240 before selecting an action. For example, if the records indicate that the user has posted many negative content items 117 about the entity and has already received several discounts, it may indicate the user is either trying to scam the entity for discounts or that the user cannot be satisfied. In such a scenario, the action module 230 may respond to the user to contact customer service and may not provide any additional gifts or rewards.

The action module 230 may further use the action database 240 to identify users who may be candidates for a rewards program associated with the entity. For example, the action database 240 may indicate the user has provided several positive content items 117 with respect to the entity. The action module 230 may then offer the user a payment or credit for each additional positive content item 117 that the user generates. The size of the payment or credit may be proportional to the influence of the user, for example.

As may be appreciated, the external content engine 116 described herein provides many advantages over the prior art. First, by monitoring multiple external data sources 170 for related content items 117 for entities, determining the positive or negative contexts of the content items 117, and automatically taking one or more actions such as contacting customer service, the amount of time and resources that are spent by an entity to protect their reputation and brands on external data sources 170 is greatly reduced. Second, because the rewards or gifts that are offered to users based on the size of their influence, the user engagement received from each reward or gift is maximized.

Figure 3:
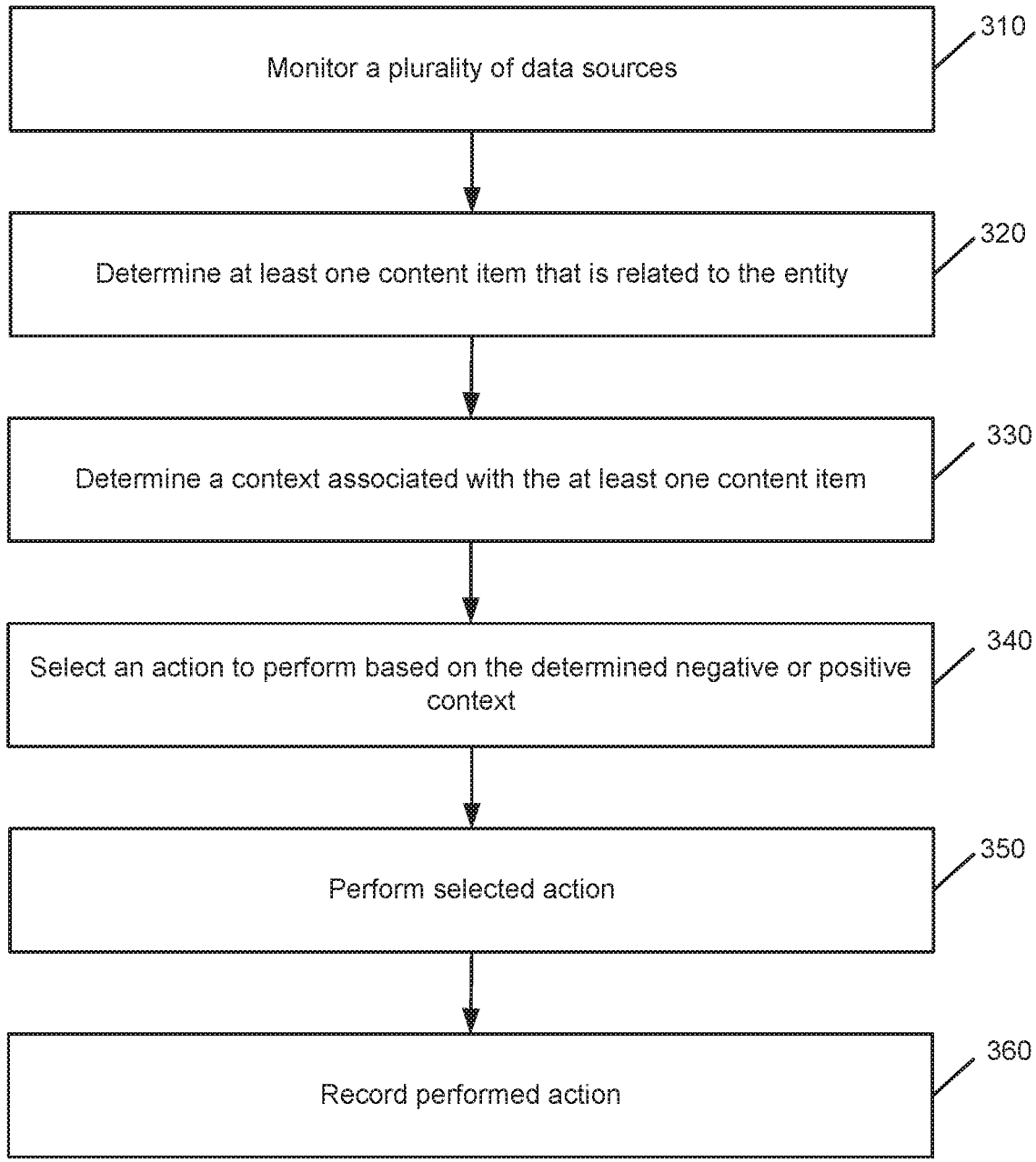
FIG. 3 is an operational flow of an implementation of a method for monitoring external data sources for related content items and for performing one or more actions.

FIG. 3 is an operational flow of an implementation of a method 300 for monitoring external data sources 170 for relevant content items 117 and for performing one or more actions. The method 300 may be implemented by the external context engine 116.

At 310, a plurality of data sources is monitored. The external data sources 170 may be monitored in parallel by the content identification module 210 on behalf of an entity such as a corporation, organization, or individual. The external data sources 170 may include online merchants 171, social media platforms 172, and discussion forums 173. Depending on the embodiment, the content identification module 210 may monitor an external data source 170 by processing content items 117 associated with each external data source 170. Content items 117 may include public messages, reviews, tweets, forum postings, posts, and any other type of public communication that may be displayed or published by an external data source 170. Each content item 117 may be associated with a user or user account.

At 320, at least one content item that is related to the entity is determined. The at least one content item 117 may be determined by the content identification module 210. Depending on the embodiment, a content item 117 may be related to the entity if it contains or references text that includes any of the name of the entity, a social networking account associated with the entity, a brand, product, or service associated with the entity, or the names of any individuals such as a spokesperson or CEO associated with the entity.

At 330, a context associated with the content item is determined. The context may be determined by the context module 220. Depending on the embodiment, the context may be a negative context or a positive context. A negative context may imply that the content item 117 is discussing or characterizing the entity in a negative way, while a positive context may imply that the content item 117 is discussing or characterizing the entity in a positive way. The context of the content item 117 may be determined by looking for words or phrases in the content item, reviews, and replies to the content item 117 that may indicate whether it is positive or negative. Any method may be used.

At 340, an action is selected to perform based on the determined context. The action may be selected by the action module 230. In some embodiments, the action may be responding to the content item 117. For example, if the content item 117 is a negative posting on a social media platform 172, the action may be a reply that includes an apology or an instruction to contact customer service. If the content item 117 is a positive review on an online merchant 171, the action may be a reply to the review thanking the user or author of the review. Other examples of actions may include providing coupons, rewards, or other incentives to the user or author of the content item 117.

At 350, the selected action is performed. The selected action may be performed by the action module 230.

At 360, the performed action is recorded. The performed action may be recorded by the action module 230 in the action database 240. The record of the action may include an identifier of the content item 117, the external data source 170 associated with the content item 117, the context, and an identifier of the user or author associated with the content item 117. Other information may be included.

Figure 4:
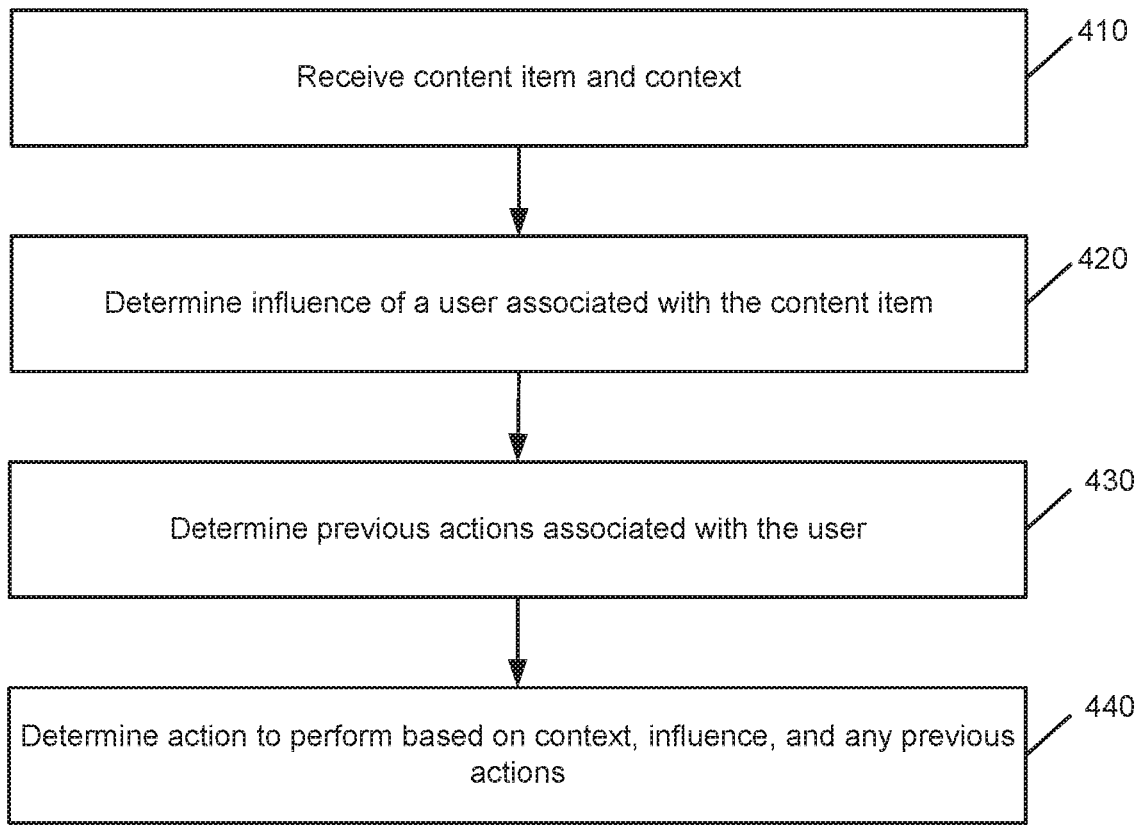
FIG. 4 is an operational flow of an implementation of a method for determining an action to perform for a content item.

FIG. 4 is an operational flow of an implementation of a method 400 for determining an action to perform for a content item 117. The method 400 may be implemented by the external content engine 116.

At 410, a content item 117 and context are received. The content item 117 and the context may be received by the action module 230. The content item 117 may be associated with a user and have been identified by the content identification module 210 as being related to the entity.

At 420, the influence of the user associated with the content item is determined. The influence of the user may be determined by the action module 230. The influence of the user may be calculated using a variety of factors that may depend on the type of content item 117 or the external data source 170 associated with the content item 117. For example, the influence may be calculated based on the number of likes, re-posts or other interactions associated with the content item 117, the number of followers or contacts associated with the user, a reputation or score associated with the user, and the overall number of content items 117 generated by the user. Other methods may be used.

At 430, any previous actions associated with the user are determined. The previous actions may be determined by the action module 230 searching the action database 240 for actions that were previously performed for other content items 117 associated with the user. Depending on the embodiment, the search may be limited to a particular timeframe such as within the last year. Other timeframes may be considered.

At 440, an action to perform is selected based on the context, the determined influence, and the determined previous actions. The action may be selected by the action module 230 from among actions such as responding to content item 117 or offering one or more incentives or rewards to the user. The influence associated with the user may be considered when determining how large of an incentive or reward to offer the user (e.g., the greater the influence the greater the reward), or when the incentive or reward expires (e.g., the greater the influence the later the expiration date). The number of determined previous actions may be considered to determine if the user is a scammer or serial complainer who may be taking advantage of the entity to receive discounts. If the number of determined previous actions is greater than a threshold, then no action may be selected to perform, or only actions such as offering an apology or offering to have customer service contact the user may be selected.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for selecting actions to perform for an entity based on content items comprising:
  continuously monitoring a plurality of external data sources in parallel for an entity via a network by an external content engine;
  detecting at least one electronic content item associated with one external data source of the plurality of external data sources that is related to the entity by the content engine;
  calculating a relevance score for the at least one electronic content item by the content engine;
  determining that the relevance score exceeds a first threshold by the content engine;
  determining whether the at least one electronic content item has a negative context or a positive context by the content engine in response to determining that the relevance score exceeds the first threshold;
  determining previous actions performed with respect to a user associated with the at least one electronic content item by the content engine, wherein the previous actions were performed for different electronic content items than the at least one electronic content item;

determining an influence associated with the user by the content engine;
determining that a number of determined previous actions does not exceed a second threshold by the content engine;
and
responsive to the determination that the number of previous actions does not exceed the second threshold:
  selecting an action to perform based on the determined negative or positive context and the determined previous actions by the content engine, wherein the action comprises offering to the user associated with the at least one content item one or more of a reward, a discount, a gift, or an incentive on the user device;
  determining an amount and an expiration date of the one or more of the reward, the discount, the gift, or the incentive based on the determined influence; and
  performing the selected action by the content engine on a user device.

2. The method of claim 1, wherein the plurality of external data sources are online merchants, social media platforms, or online forums.

3. The method of claim 1, wherein detecting the at least one electronic content item associated with one external data source of the plurality of external data sources that is related to the entity comprises detecting an electronic content item that includes one or more of: a name of the entity, a website associated with the entity, a name of a product, a service, or a brand associated with the entity, an identifier of a social media account associated with the entity, an email address associated with the entity, a phone number associated with the entity, and a name of an executive or a spokesperson associated with the entity.

4. The method of claim 1, wherein the at least one electronic content item comprises one or more of a post or a message on a social networking platform, a review, or a message on an online forum.

5. The method of claim 1, wherein determining whether the at least one electronic content item has a negative context or a positive context comprises processing the content item using natural language processing.

6. The method of claim 1, wherein the influence and the expiration date are determined based on a number of followers associated with the user.

7. The method of claim 6, wherein the greater the influence the greater the expiration date.

8. A system for selecting actions to perform for an entity based on content items comprising:
  at least one processor; and
  a memory storing instructions that, when executed by the at least one processor, cause the at least one processor to:
  continuously monitor a plurality of external data sources for an entity in parallel via a network;
  detect at least one electronic content item associated with one external data source of the plurality of external data sources that is related to the entity;
  calculate a relevance score for the at least one electronic content item;
  determine that the relevance score exceeds a first threshold;
  determine whether the at least one electronic content item has a negative context or a positive context in response to determining that the relevance score exceeds the first threshold;
  determine previous actions performed with respect to a user associated with the at least one electronic content item, wherein the previous actions were performed for different electronic content items than the at least one electronic content item;
  determine an influence associated with the user;
  determine that a number of determined previous actions does not exceed a second threshold;
  and
  responsive to the determination that the number of previous actions does not exceed the second threshold:
    select an action to perform based on the determined negative or positive context and the determined previous actions, wherein the action comprises offering to the user associated with the at least one content item one or more of a reward, a discount, a gift, or an incentive on the user device;
    determine an amount and an expiration date of the one or more of the reward, the discount, the gift, or the incentive based on the determined influence; and
    perform the selected action on a user device.

9. The system of claim 8, wherein the plurality of external data sources are social media platforms, online merchants, or online forums.

10. The system of claim 8, wherein the instructions that when executed by the at least one processor cause the at least one processor to detect at least one electronic content item associated with one external data source of the plurality of external data sources that is related to the entity further comprise instructions that when executed by the at least one processor cause the at least one processor to detect a content item that includes one or more of: a name of the entity, a website associated with the entity, a name of a product, a service, or a brand associated with the entity, an identifier of a social media account associated with the entity, an email address associated with the entity, a phone number associated with the entity, and a name of an executive or a spokesperson associated with the entity.

11. The system of claim 8, wherein the at least one electronic content item comprises one or more of a post or a message on a social networking platform, a review, or a message on an online forum.

12. The system of claim 8, wherein the instructions that when executed by the at least one processor cause the at least one processor to determine whether the at least one electronic content item has a negative context, or a positive context further comprise instructions that when executed by the at least one processor cause the at least one processor to process the at least one content item using natural language processing.

13. The system of claim 8, wherein the influence and the expiration date are determined based on a number of followers associated with the user.

14. A non-transitory computer readable medium comprising instructions that, when executed by at least one processor, cause the at least one processor to:
  continuously monitor a plurality of external data sources in parallel for an entity;
  detect at least one content item associated with one external data source of the plurality of external data sources that is related to the entity;
  calculate a relevance score for the at least one electronic content item;
  determine that the relevance score exceeds a first threshold;
  determine whether the at least one content item has a negative context or a positive context in response to determining that the relevance score exceeds the first threshold;

determine an influence associated with the user;
determine previous actions performed with respect to a user associated with the at least one content item, wherein the previous actions were performed for different content items than the at least one content item;
determine that a number of determined previous actions does not exceed a second threshold; and
responsive to the determination that the number of previous actions does not exceed the second threshold:
   select an action to perform based on the determined negative or positive context and the determined previous actions, wherein the action comprises offering to the user associated with the at least one content item one or more of a reward, a discount, a gift, or an incentive on the user device;
   determine an amount and an expiration date of the one or more of the reward, the discount, the gift, or the incentive based on the determined influence; and
   perform the selected action on a user device.

\* \* \* \* \*